United States Patent [19]
Ebner et al.

[11] Patent Number: 4,853,304
[45] Date of Patent: Aug. 1, 1989

[54] ELECTROLYTE FOR SECONDARY NON-AQUEOUS CELLS

[75] Inventors: Walter B. Ebner, Warminster, Pa.; Hsiu-Ping W. Lin, Cherry Hill, N.J.

[73] Assignee: Honeywell, Inc., Minneapolis, Minn.

[21] Appl. No.: 146,533

[22] Filed: Jan. 21, 1988

[51] Int. Cl.$^4$ .............................................. H01M 6/14
[52] U.S. Cl. ................................... 429/192; 252/62.2
[58] Field of Search ....................... 429/194; 252/62.2

[56] References Cited

U.S. PATENT DOCUMENTS

| | | | |
|---|---|---|---|
| 3,544,385 | 12/1970 | Newman | 429/197 |
| 3,976,509 | 8/1976 | Tsai et al. | 429/194 |
| 4,085,256 | 4/1978 | Dey | 429/48 |
| 4,219,392 | 8/1980 | Haumann | 204/72 |

OTHER PUBLICATIONS

Chemical Abstract, vol. 102, No. 35351, 1985.
V. R. Koch et al., "The Stability of the Secondary Lithium Electrode in Tetrahydrofuran-Based Electrolytes", Electrochemical Science and Technology, Sep. 1978, pp. 1371-1377, vol. 125, No. 9.
S. B. Brummer et al., "The Recharging of the Lithium Electrode in Organic Electrolytes", Materials for Advanced Batteries, pp. 123-143.

Primary Examiner—Stephen J. Kalafut
Attorney, Agent, or Firm—C. G. Mersereau

[57] ABSTRACT

An improved non-aqueous electrolyte solution for lithium cells is disclosed which utilizes an organic ester of methyl formate together with lithium salt and an amount of $CO_2$ in the electrolyte solution. The active lithium anode may also be pretreated with $CO_2$.

23 Claims, 4 Drawing Sheets

ELECTROLYTE FOR SECONDARY NON-AQUEOUS CELLS

BACKGROUND OF THE INVENTION

1. Field of the Invention

The present invention relates to non-aqueous electrochemical cells and, more particularly, to improvements with respect to the recharging of secondary active metal cells including those utilizing anodes of lithium metal. The invention allows such cells to achieve suitable high recharging efficiencies without sacrifice of high cell capacity.

2. Description Of the Prior Art

As is well known in the art, non-aqueous active metal cells have enabled those skilled in the art to achieve much higher energy densities or energy to weight ratios then was heretofore known. The potential uses for such cells has created a great deal of interest, resulting in significant efforts to improve the safety and versatility of these cells.

Such cells typically consist of a light, strongly reducing anode, normally an alkali metal such as lithium, an aprotic, non-aqueous solvent into which has been dissolved an appropriate quantity of a salt of the anode metal to form a conductive solution, and an oxidizing agent as the cathode material. In some instances, the electrolyte solvent or co-solvent also acts as the active cathode material which is subsequently reduced at a porous carbon electrode. Such dual-function solvents include thionyl chloride, sulfuryl chloride, and sulfur dioxide.

While primary lithium cells have been in use for quite some time, the development of a practical rechargeable lithium cell has been severely hindered by the inability to efficiently recharge the lithium anode. Because of its high reactivity, a significant fraction of the lithium metal plated out during recharging undergoes side reactions with the electrolyte solution and thereby becomes unsheathed in a layer of nonconductive reaction products. This encapsulated lithium is electrically insulated from the anode and thus can no longer participate in the electrochemical reactions. Some lithium is lost in this manner during each recharge cycle until virtually the whole anode is consumed. The lithium cycling efficiency provides a measure of the rechargeability of the lithium anode in a given electrolyte solution and values of greater than 90%, and preferably greater than 95%, are needed if rechargeable lithium cells are to be practical.

In the prior art, most rechargeable lithium cells employed an organic solvent-based electrolyte solution with an insoluble, solid oxidant cathode material. Ether-based electrolyte solutions have been predominately used in these cells. In particular, cells utilizing $LiAsF_6$ dissolved in 2-methyl tetrahydrofuran (2-methyl THF) as the electrolyte solution have provided the best overall performance, yielding lithium cycling efficiencies of up to 97% in prototype hardware cells. However, while these solutions are very promising with respect to lithium cycling efficiency, they exhibit low conductivities which severely degrade cell performance at low temperatures (i.e. below 0° C.) or at high rates of discharge.

Thus, there remains a need in the art for secondary rechargeable cells exhibiting both of the desirable characteristics including:

1. High lithium cycling efficiencies so that a practical number of cycles can be achieved during the life of the cell and, 2. sufficient cell conductivity so that the advantage obtained by the high energy density nature of the cell can be maintained over a broad temperature interval and over a wide range of discharge rates.

SUMMARY OF THE INVENTION

The present invention concerns significant improvements in secondary active metal, non-aqueous cells having organic-based electrolyte solutions, particularly solutions which employ ester solvents. It enables the two goals mentioned above to be reached.

According to the present invention, it has been discovered that carbon dioxide ($CO_2$) has highly beneficial effects in enhancing desirable properties of such secondary cells. The carbon dioxide can be used in two ways, namely, to pretreat the lithium anode prior to exposure to the electrolyte solution and/or as an electrolyte solution additive. The use of carbon dioxide as an electrolyte solution additive, however, has been found to produce the greatest effect.

In the preferred embodiment, the anode is lithium and the active cathode material is a transition metal oxide such as $V_2O_5$. The preferred electrolyte ester solvent is methyl formate ($HCOOCH_3$). The electrolyte salt normally used is $LiAsF_6$ and an amount of $LiBF_4$ may also be present.

Ester-based solutions can offer conductivities almost an order of magnitude greater than prior art solutions, thus allowing cells to operate efficiently over the entire temperature range from "40° C. to +75° C. The $CO_2$-doped electrolyte solutions of the present invention are used principally with respect to secondary or rechargeable cells. However, it has also been discovered that $CO_2$ reduces anode polarization and appears to reduce passivism effects in methyl formate solutions, thus offering benefits for primary cell applications as well.

Thus, of the present invention it might be said that a primary object of the present invention is to improve the efficiency of secondary cells and that a secondary object of the invention is to improve the efficiency of primary cells.

DESCRIPTION OF THE PREFERRED EMBODIMENTS

The two most important factors concerning electrolyte solutions for secondary or rechargeable cells of the class described are (1) maintaining sufficiently high conductivities to allow cells to operate over a broad temperature range at moderate to high rates of discharge and (2) providing for efficient cycling of the lithium anode such that a sufficient number of recharging cycles are possible.

Figure 1:
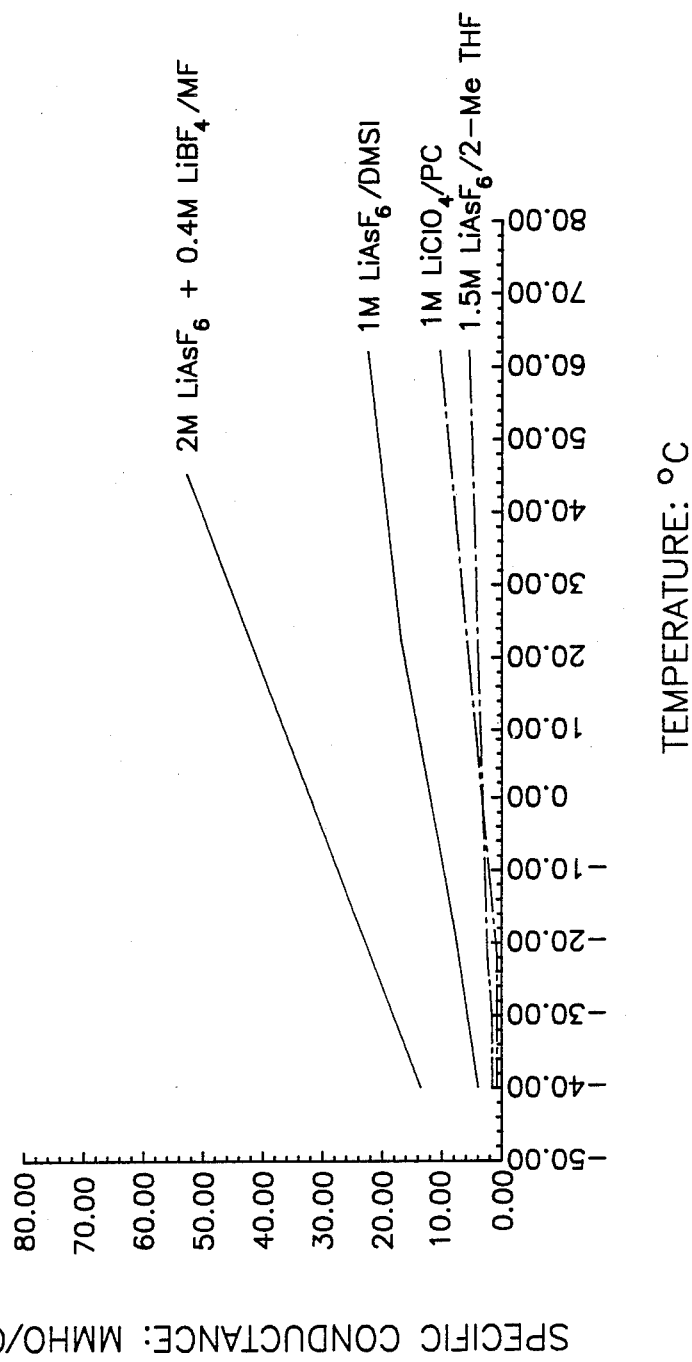
FIG. 1 compares the specific conductivity of several electrolyte solutions over a wide temperature range.

FIG. 1 illustrates the dramatic increase in specific conductivity that can be realized with ester-based electrolyte solutions, exemplified by the methyl formate solution, over current state-of-the-art solutions such as the 1.5 M LiAsF$_6$/2-methyl THF solution. This superiority of the ester-based solutions holds throughout the full military specification temperature range of $-40°$ C. to $+75°$ C. In fact, the methyl formate solutions are better by almost an order of magnitude over most of this range.

Figure 2:
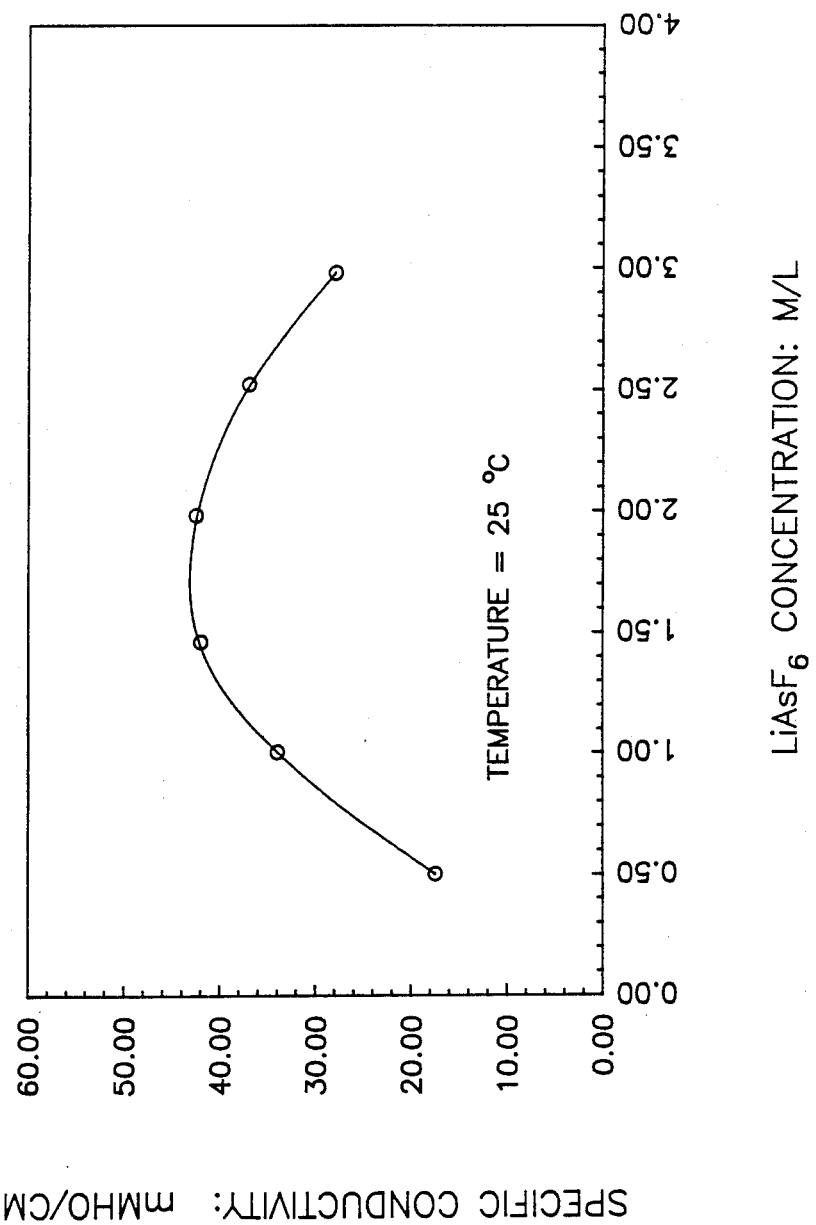
FIGS. 2 and 3 show the specific conductivity at 25° C. versus electrolyte concentration, without and with $LiBF_4$, in methyl formate.
Figure 3:
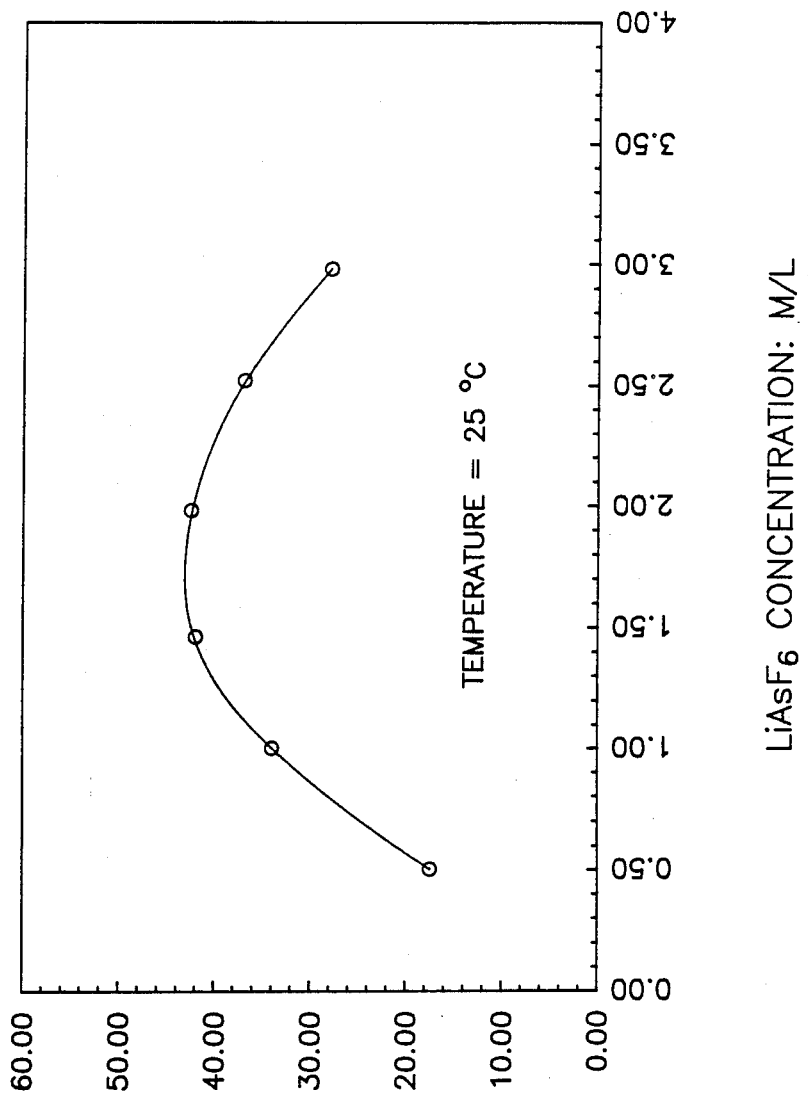

LiBF$_4$ is normally used in methyl formate solutions to improve solution stability at elevated temperatures and is generally added at one fifth of the LiAsF$_6$ concentration. FIGS. 2 and 3 show that the specific conductivity of the methyl formate solutions reach a maximum at a LiAsF$_6$ concentration between 1.5 and 2M and that the added LiBF$_4$ has very little effect on the specific conductivity. The data given in TABLE I further show that methyl formate solutions offer excellent conductivities over a wide range of solute concentrations. In fact, the value of 17.3 mMHO/cm yielded by a 0.5 M LiAsF$_6$ solution is even sufficient for most cell applications.

TABLE I

CONDUCTIVITY VS SOLUTE CONCENTRATION
XM LiAsF$_6$ + X/5M LiBF$_4$/MF ELECTROLYTE SOLUTIONS

| LiAsF$_6$ CONCENTRATION, M/L | LiBF$_4$ CONCENTRATION, M/L | SPECIFIC CONDUCTIVITY, mMHO/CM |
| --- | --- | --- |
| 0.5 | 0.1 | 17.3 |
| 1.0 | 0.2 | 34.4 |
| 1.5 | 0.3 | 43.0 |
| 2.0 | 0.4 | 43.1 |
| 2.5 | 0.5 | 37.3 |
| 3.0 | 0.6 | 28.2 |

Temperature = 25° C.

The second key factor for any electrolyte solution considered for use in a rechargeable lithium cell is to provide for efficient cycling of the lithium anode. To achieve long cycle life capabilities in practical hardware, lithium cycling efficiencies of greater than 90% and preferably greater than 95% are required. Lithium cycling efficiency tests were conducted by stripping and plating lithium on a working lithium electrode at 1.0 mA/cm$^2$. The charge passed during each half-cycle represented approximately a 20 percent depth of discharge, based on the starting capacity of the working lithium electrode. The tests were continued until the working lithium electrode was completely consumed. The cycling efficiency was then determined using the following relationship:

$$E = \frac{C_i - \frac{C_o - C_i}{n}}{C_1}$$

where,
E = Lithium cycling efficiency, %
C$_o$ = Starting capacity of lithium working electrode, mAh
C$_i$ = Capacity of lithium plated and stripped during each half-cycle, mAh
n = Total number of cycles achieved.

With respect to the use of CO$_2$, pretreatment of the working lithium electrodes was carried out by storing the electrodes in a sealed vessel with 20 psig CO$_2$ pressure for 3, 24, or 120 hours. This technique was found to yield the greatest improvement in the more concentrated solutions. For example, the measured lithium cycling efficiency for a 2 M LiAsF$_6$30 0.4 M LiBF$_4$/MF solution was increased from 70% to 81% while no change in efficiency was observed for a 0.5 M LiAsF$_6$ +0.1 M LiBF$_4$/MF solution. The highest lithium cycling efficiency obtained using this approach was 87 percent for a 1.0 M LiAsF$_6$+0.2 M LiBF$_4$/MF solution.

Figure 4:
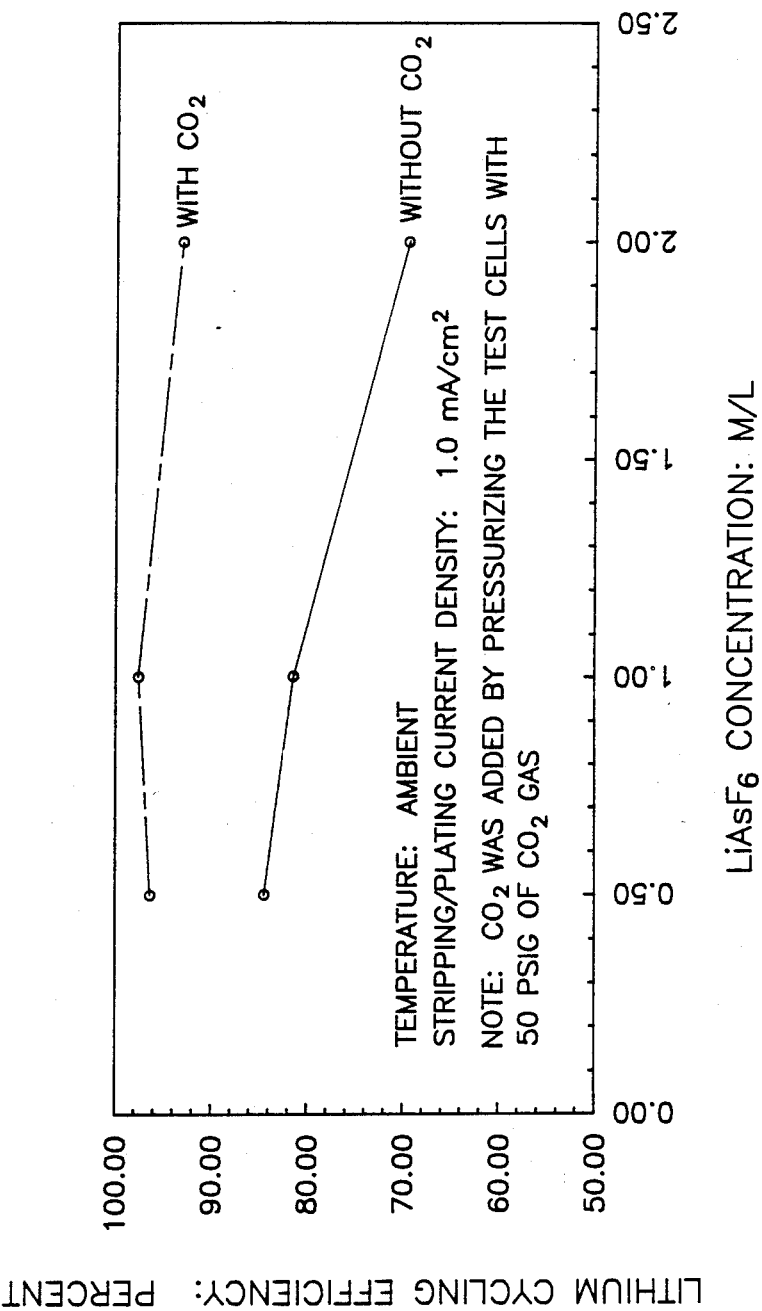
FIG. 4 shows lithium cycling efficiency versus electrolyte concentration, with and without $CO_2$, in methyl formate.

In the tests involving CO$_2$ as an electrolyte additive, solutions were normally first saturated with CO$_2$ and then, following activation, the cells were pressurized with CO$_2$ gas (pressures of 8 and 50 psig were employed in the tests conducted). Table II compares the measured efficiency values of methyl formate solutions with and without CO$_2$ added while FIG. 4 shows the results graphically. As can be seen from the results, adding CO$_2$ to the solutions brought about a dramatic improvement in lithium cycling efficiency. In fact, the efficiency value of 98% achieved with the 1.0 M LiAsF$_6$+0.2 M LiBF$_4$/MF solution exceeds the best reported value for 2-methyl THF solutions. Furthermore, CO$_2$ was also observed to decrease anode polarization levels and appears to reduce anode passivism effects in the methyl formate solutions. Significantly, these enhancements were all achieved without any loss in conductivity or other detrimental effects.

TABLE II

LITHIUM CYCLING EFFICIENCIES FOR
XM LiAsF$_6$ + $\frac{X}{5}$ M LiBF$_4$/MF ELECTROLYTE SOLUTIONS

| LiAsF$_6$ CONCENTRATION, | LiBF$_4$ CONCENTRATION, | LITHIUM CYCLING EFFICIENCY, | COMMENTS |
| --- | --- | --- | --- |
| 0.5 | 0.1 | 84.6 | Without CO$_2$ |
| 1.0 | 0.2 | 81.1 | Without CO$_2$ |
| 2.0 | 0.4 | 69.7 | Without CO$_2$ |
| 0.5 | 0.1 | 96.3 | With CO$_2$ |
| 1.0 | 0.2 | 98.3 | With CO$_2$ |
| 2.0 | 0.4 | 93.0 | With CO$_2$ |

NOTES:
(1) All tests were conducted at ambient temperature using a stripping/plating current density of 1.0 mA/cm$_2$.
(2) Carbon dioxide (CO$_2$) was added by pressurizing the test cells with 50 psig of CO$_2$ gas.

Although the mechanism is not well understood at this time, it is believed that CO$_2$ acts as a precursor to form an ionically conductive, protective film on the surface to the lithium metal which prevents freshly deposited lithium from undergoing parasitic side reactions with the electroltye solution. It is further proposed that CO$_2$ could also be altering the morphology of the plated lithium, making it less dendritic in nature. In any event, however, the beneficial effects of $CO_2$ appear unique to ester solutions, including methyl formate, and are not present in other typical lithium cell electrolyte solutions investigated.

This invention, therefore, describes an improved ester-based solution that offers greatly enhanced lithium cycling efficiencies for use in long cycle life rechargeable cells. These improvements are achieved using $CO_2$ as an electrolyte additive and/or to pretreat the lithium anodes.

In addition to the benefits the present invention brings to secondary lithium cells, it should be noted that the invention is also applicable to primary cells. This is because it has been discovered that $CO_2$ reduces anode polarization in methyl formate solutions and appears to reduce passivism effects.

What is claimed is:

1. An improved electrolyte solution for lithium non-aqueous secondary cells comprising a solution of methyl formate containing an amount of lithium salt and an amount of $CO_2$ in said electrolyte solution.

2. The electrolyte solution of claim 1 wherein said lithium salt consists of a combination $LiAsF_6$ and $LiBF_4$.

3. The electrolyte of claim 2 wherein the electrolyte salt is proportioned according to the relationship where: X has a value between 0.25 and 4.0 and $$XM\ LiAsF_6 + \frac{X}{5} M\ LiBF_4$$

M is molarity.

4. The electrolyte of claim 2 wherein the solution is saturated with $CO_2$.

5. The electrolyte of claim 3 wherein the solution is saturated with $CO_2$.

6. A non-aqueous electrolyte solution for active metal cells having an active metal anode comprising:
an organic ester solvent;
an amount of an electrolyte salt of the active metal of the anode in said solvent; and
an amount of carbon dioxide in said solution.

7. The electrolyte solution of claim 6 wherein the active metal is lithium.

8. The electrolyte solution of claim 6 wherein the organic ester is a formate.

9. The electrolyte solution of claim 7 wherein the organic ester is a formate.

10. The electrolyte solution of claim 9 wherein the organic ester is methyl formate.

11. The electrolyte solution of claim 9 wherein the electrolyte salt is $LiAsF_6$.

12. The electrolyte solution of claim 10 wherein said electrolyte salt is $LiAsF_6$.

13. The electrolyte solution of claim 12 wherein the solution also contains an amount of $LiBF_4$.

14. The electrolyte solution of claim 8 wherein the solution is saturated with $CO_2$.

15. The electrolyte solution of claim 9 wherein the solution is saturated with $CO_2$.

16. The electrolyte solution of claim 10 wherein the solution is saturated with $CO_2$.

17. The electrolyte solution of claim 13 wherein the solution is saturated with $CO_2$.

18. A method for improving the operating and recharging characteristics of a non-aqueous electrochemical cell comprising an active metal anode, an electrolyte system solution including an organic ester solvent and an amount of an electrolyte salt of the metal of the anode in said solvent, and a cathode, comprising the step of, adding an amount of carbon dioxide to said electrolyte system.

19. The method of claim 18 wherein said organic ester is an aliphatic ester.

20. The method of claim 19 wherein said ester is methyl formate.

21. The method of claim 18 wherein said electrolyte system solution is saturated with $CO_2$.

22. The method of claim 19 wherein said electrolyte system solution is saturated with $CO_2$.

23. The method of claim 20 wherein said electrolyte system solution is saturated with $CO_2$.

* * * * *

Disclaimer and Dedication 4,853,304—Walter B. Ebner, Warminster, Pa.; Hsiu-Ping W. Lin, Cherry Hill, N.J. ELECTROLYTE FOR SECONDARY NON-AQUEOUS CELLS. Patent dated August 1, 1989. Disclaimer and Dedication filed September 15, 1997, by the assignee, Alliant Techsystems Inc.

Hereby disclaims and dedicates to the Public the entire term of said patent.
*(Official Gazette,* December 9, 1997)